United States Patent
Lin et al.

(10) Patent No.: US 10,598,216 B2
(45) Date of Patent: Mar. 24, 2020

(54) ROTATIONAL ASSEMBLY

(71) Applicant: ASUSTeK COMPUTER INC., Taipei (TW)

(72) Inventors: Hsin-Chen Lin, Taipei (TW); Ing-Jer Chiou, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 16/051,735

(22) Filed: Aug. 1, 2018

(65) Prior Publication Data

US 2019/0048883 A1 Feb. 14, 2019

(30) Foreign Application Priority Data

Aug. 10, 2017 (CN) .................... 2017 2 0995885 U

(51) Int. Cl.
*F16C 17/10* (2006.01)
*F04D 25/06* (2006.01)

(52) U.S. Cl.
CPC .......... *F16C 17/107* (2013.01); *F04D 25/062* (2013.01)

(58) Field of Classification Search
CPC ........ F16C 17/02; F16C 17/026; F16C 17/10; F16C 17/102; F16C 17/107; G11B 19/2036; H02K 7/08; H02K 7/085; F04D 25/062
See application file for complete search history.

(56) References Cited

U.S. PATENT DOCUMENTS

| | | | | |
|---|---|---|---|---|
| 6,307,291 B1* | 10/2001 | Iwaki | .................... | F16C 17/045 310/261.1 |
| 7,134,791 B2* | 11/2006 | Yokoo | .................... | F16C 17/026 384/107 |
| 9,343,101 B2* | 5/2016 | Suzuki | ............... | G11B 17/0287 |
| 2005/0141136 A1* | 6/2005 | Kitamura | ........... | G11B 19/2018 360/99.08 |
| 2006/0002641 A1* | 1/2006 | Ichiyama | ............... | F16C 17/107 384/100 |
| 2006/0039634 A1* | 2/2006 | Ichiyama | ............... | F16C 17/107 384/100 |
| 2006/0222276 A1* | 10/2006 | Uenosono | ............. | F16C 17/107 384/107 |
| 2015/0235667 A1* | 8/2015 | Sugiki | ................ | G11B 19/2036 384/120 |
| 2015/0323002 A1* | 11/2015 | Jang | ........................ | H02K 7/085 360/99.11 |

FOREIGN PATENT DOCUMENTS

| | | |
|---|---|---|
| CN | 203978902 U | 12/2014 |
| TW | 201215781 A | 4/2012 |

\* cited by examiner

*Primary Examiner* — James Pilkington
(74) *Attorney, Agent, or Firm* — McClure, Qualey & Rodack, LLP

(57) ABSTRACT

A pivoting assembly includes a base, a bearing, and a rotating shaft. The bearing is disposed on the base and includes a first ring wall. The rotating shaft is sheathed in the first ring wall and rotatably disposed on the first ring wall. In this way, a larger superficial area is provided to generate an effective oil pressure acting force.

16 Claims, 12 Drawing Sheets

ROTATIONAL ASSEMBLY

CROSS-REFERENCE TO RELATED APPLICATION

This application claims the priority benefit of Chinese application serial No. 201720995885.2, filed on Aug. 10, 2017. The entirety of the above-mentioned patent application is hereby incorporated by reference herein and made a part of specification.

BACKGROUND OF THE INVENTION

Field of the Invention

The present disclosure relates to a rotational assembly.

Description of the Related Art

Generally, to prevent overheating of the electronic elements in a host and further to cause damage, fans are usually configured to the electronic elements whose temperatures easily increase, such as a power supplier, a central processing unit (CPU), and a graphics processing unit (GPU). The fans dissipate heat from the electronic element. However, the development trend of size miniaturization limits a configuration of a fan structure.

BRIEF SUMMARY OF THE INVENTION

The present disclosure discloses a rotational assembly. The rotational assembly includes a base, a bearing, and a rotating shaft. The bearing is disposed on the base and includes a first ring wall. The rotating shaft is sheathed in the first ring wall and rotatably disposed on the first ring wall.

In conclusion, the bearing of the rotational assembly in this disclosure includes the first ring wall, and the rotating shaft is sheathed in the first ring wall. Therefore, the entire bearing includes a large diameter and provides a larger superficial area to generate an effective oil pressure acting force. Therefore, the bearing in this embodiment provides a large supporting force to maintain operation of the rotating shaft. In this way, the bearing still provides a supporting force with certain degree to the rotating shaft when the thickness of the structure of the bearing is reduced.

Figure 5:
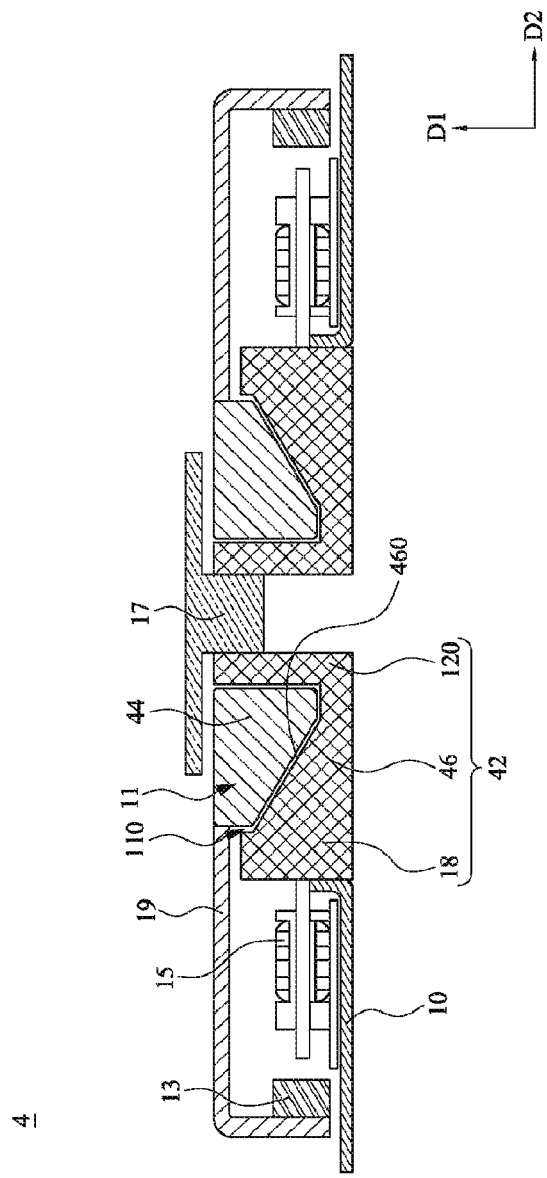
Figure 6:
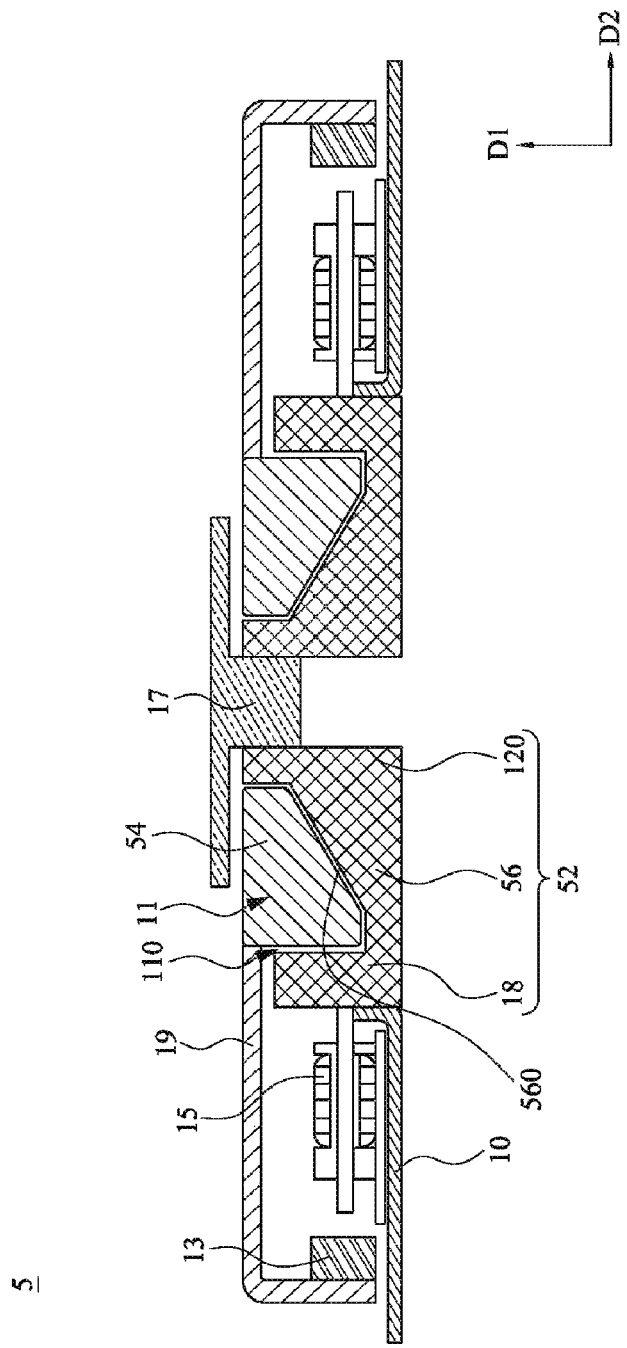
Figure 7:
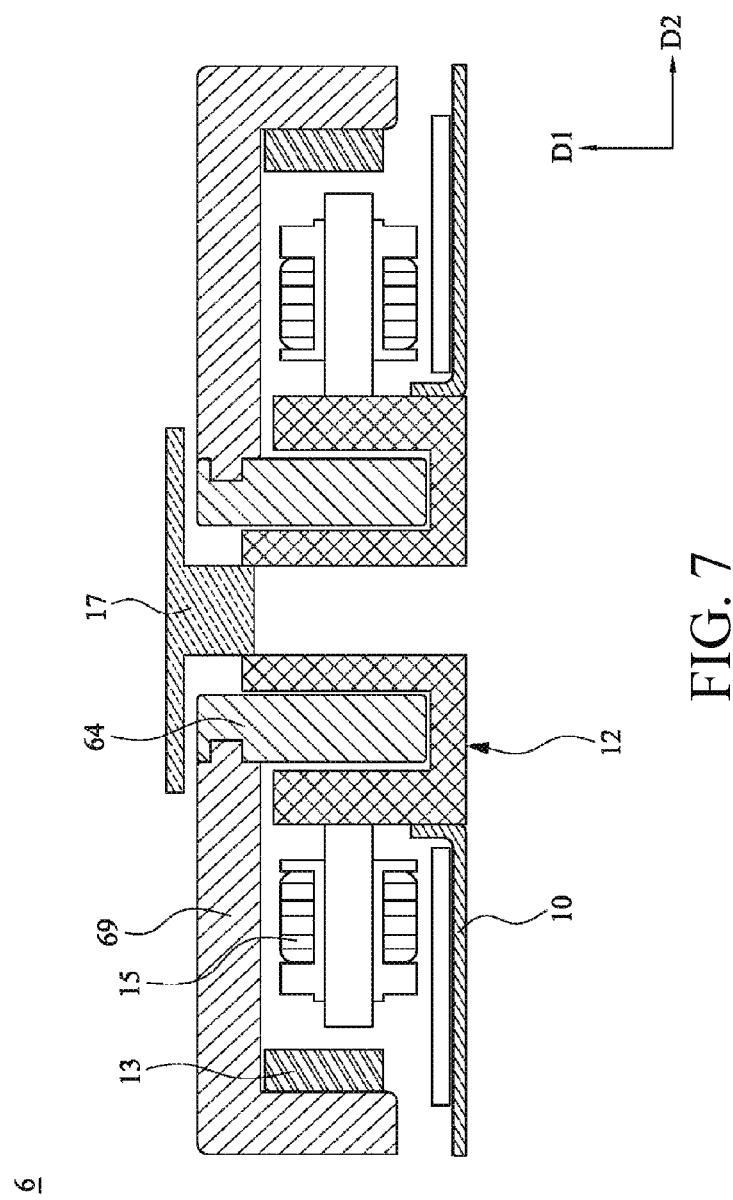
Figure 8:
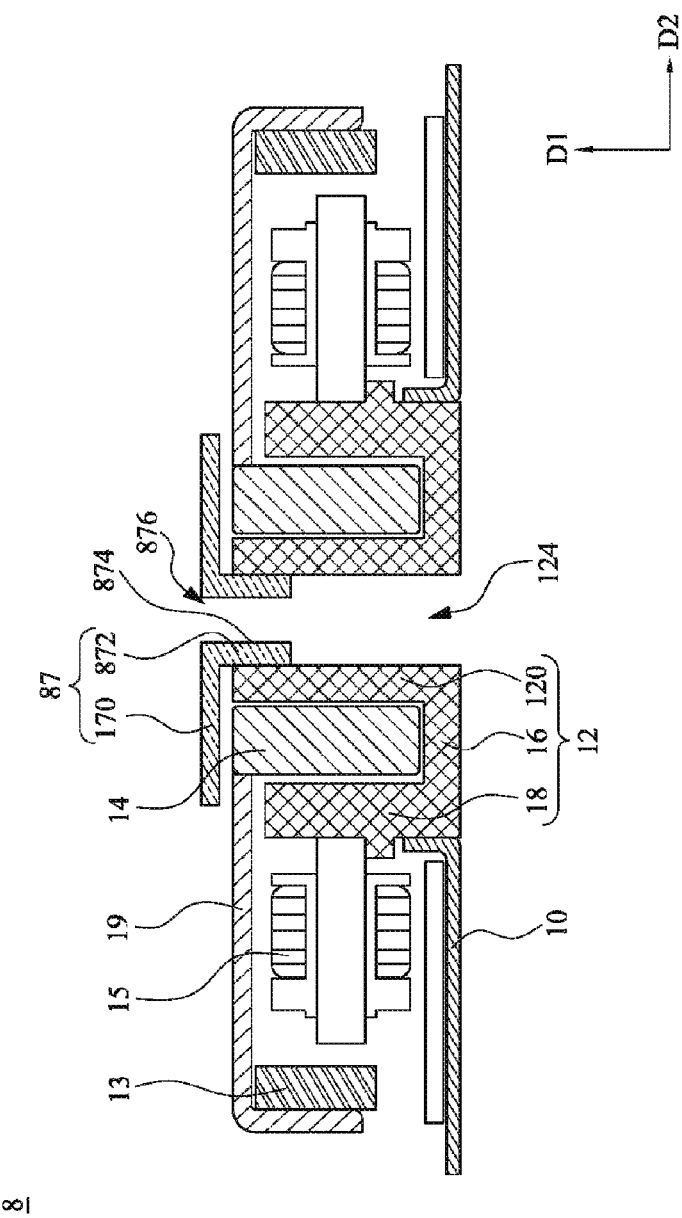
Figure 9:
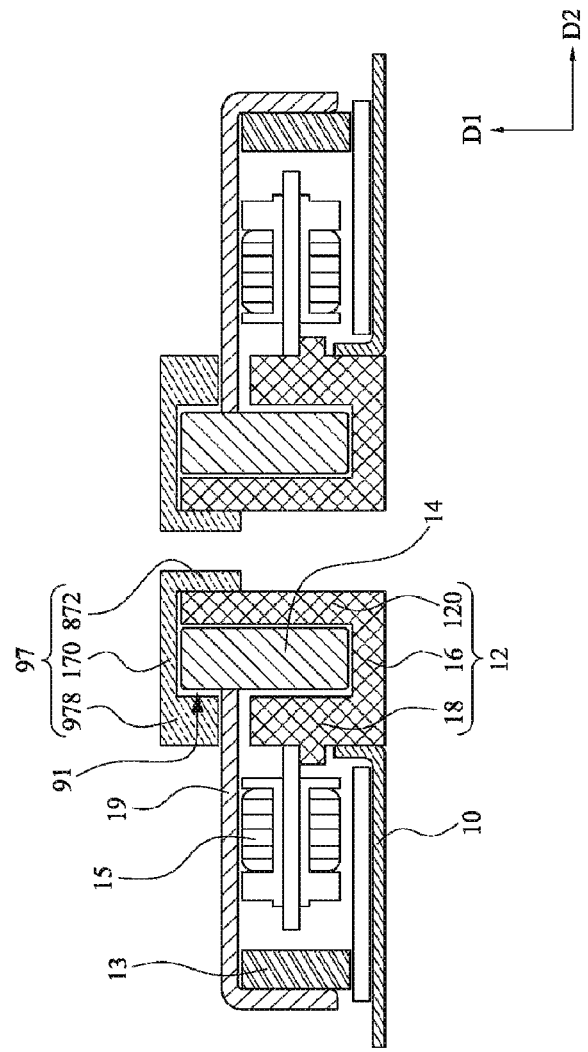
Figure 10:
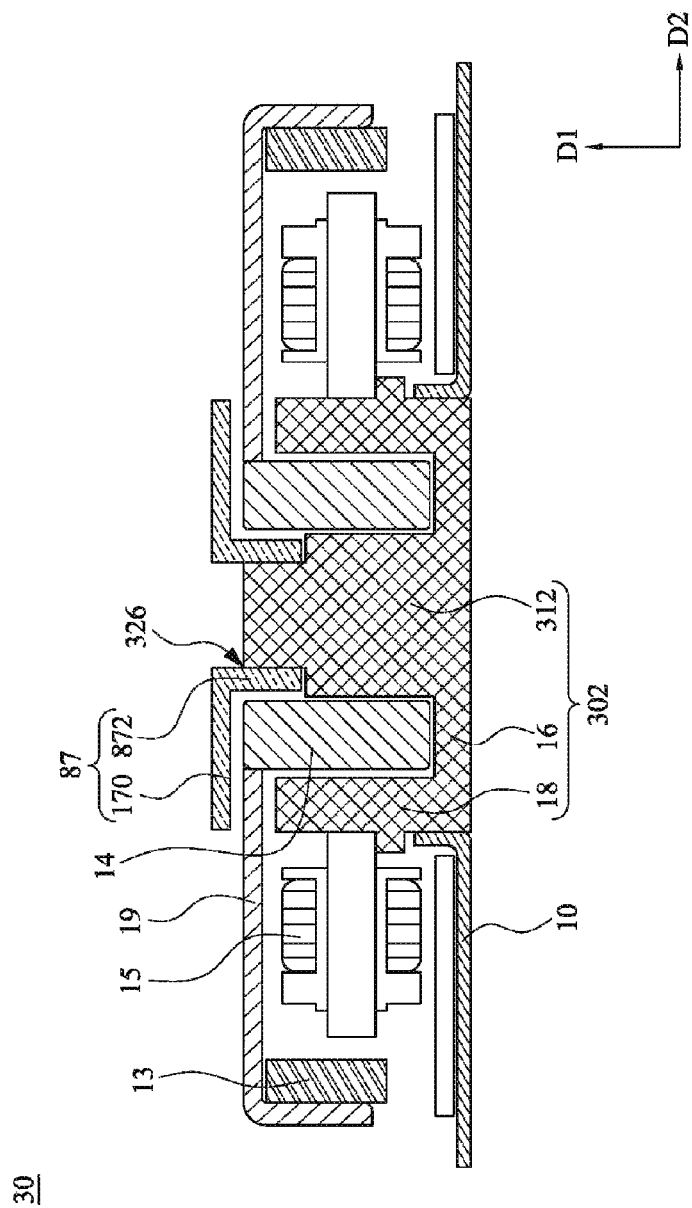
Figure 11:
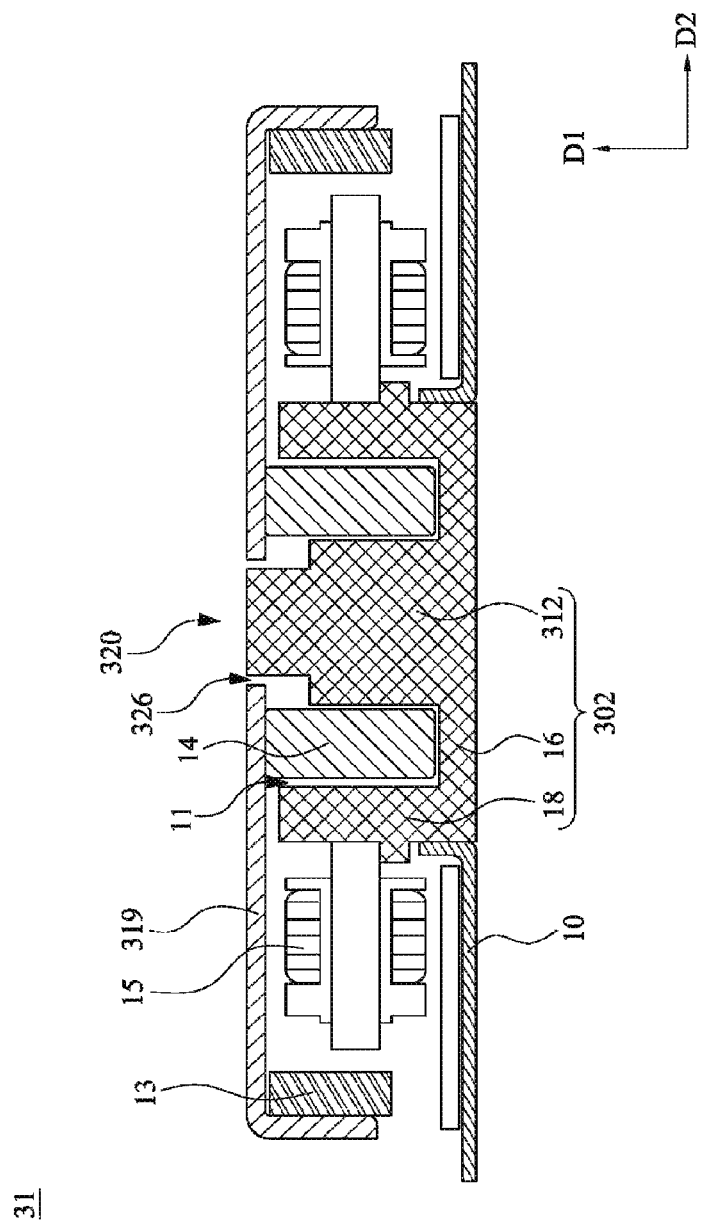
Figure 12:
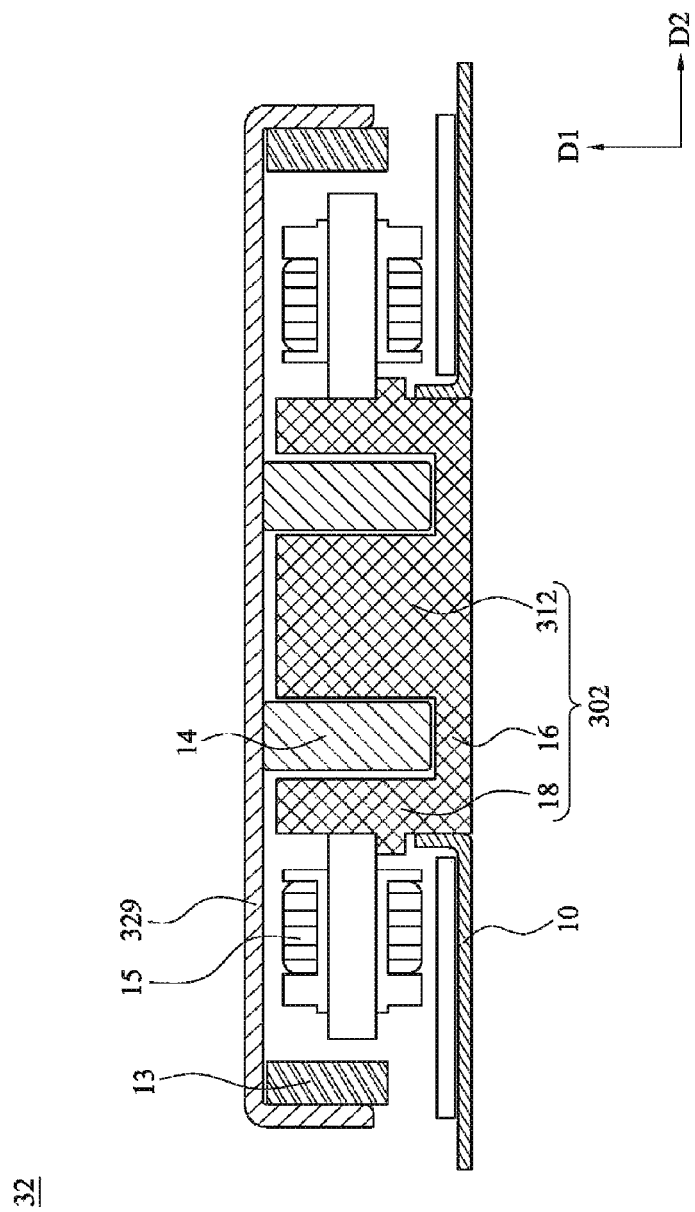

Each of FIG. 5 and FIG. 6 are a sectional view of a rotational assembly according to another embodiment of the present disclosure, where a distance between at least a portion of a bottom surface of a baseplate and an opening of a first ring-shaped groove gradually changes from a first ring wall of a bearing to a second ring wall;

FIG. 7 is a sectional view of a rotational assembly according to another embodiment of the present disclosure, where a rotor hub surrounds and is engaged with an outer edge of a rotating shaft;

FIG. 8 is a sectional view of a rotational assembly according to another embodiment of the present disclosure, where a protrusion portion of an oil seal cover is designed as a ring wall, and an inner wall of the ring wall forms a second through hole;

FIG. 9 is a sectional view of a rotational assembly according to another embodiment of the present disclosure, where an oil seal cover further includes a third ring wall;

FIG. 10 is a sectional view of a rotational assembly according to another embodiment of the present disclosure, where a side that is of a baseplate in a bearing and that is far away from a second ring wall is connected to a cylinder;

FIG. 11 is a sectional view of a rotational assembly according to another embodiment of the present disclosure, where a rotor hub covers a bearing and a rotating shaft and is connected to an end portion that is of the rotating shaft and that is far away from a baseplate; and FIG. 12 is a sectional view of a rotational assembly according to another embodiment of the present disclosure, where a rotor hub is of a structure without any through hole.

DETAILED DESCRIPTION OF THE EMBODIMENTS

Figure 1:
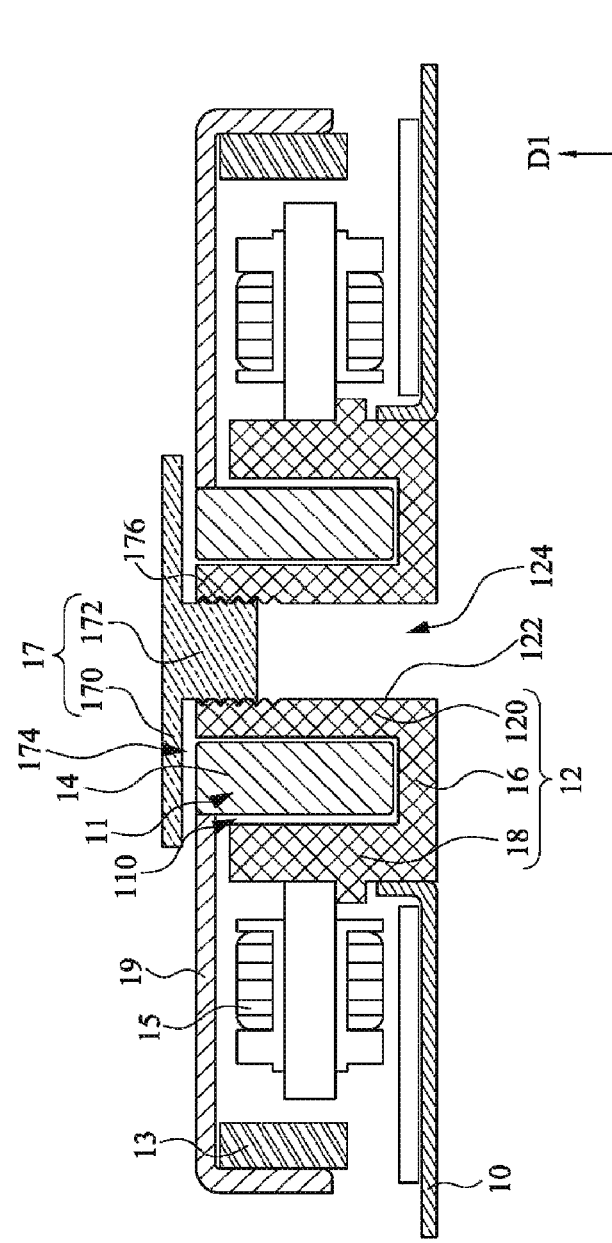
FIG. 1 is a sectional view of a rotational assembly according to an embodiment of the present disclosure.
Figure 2:
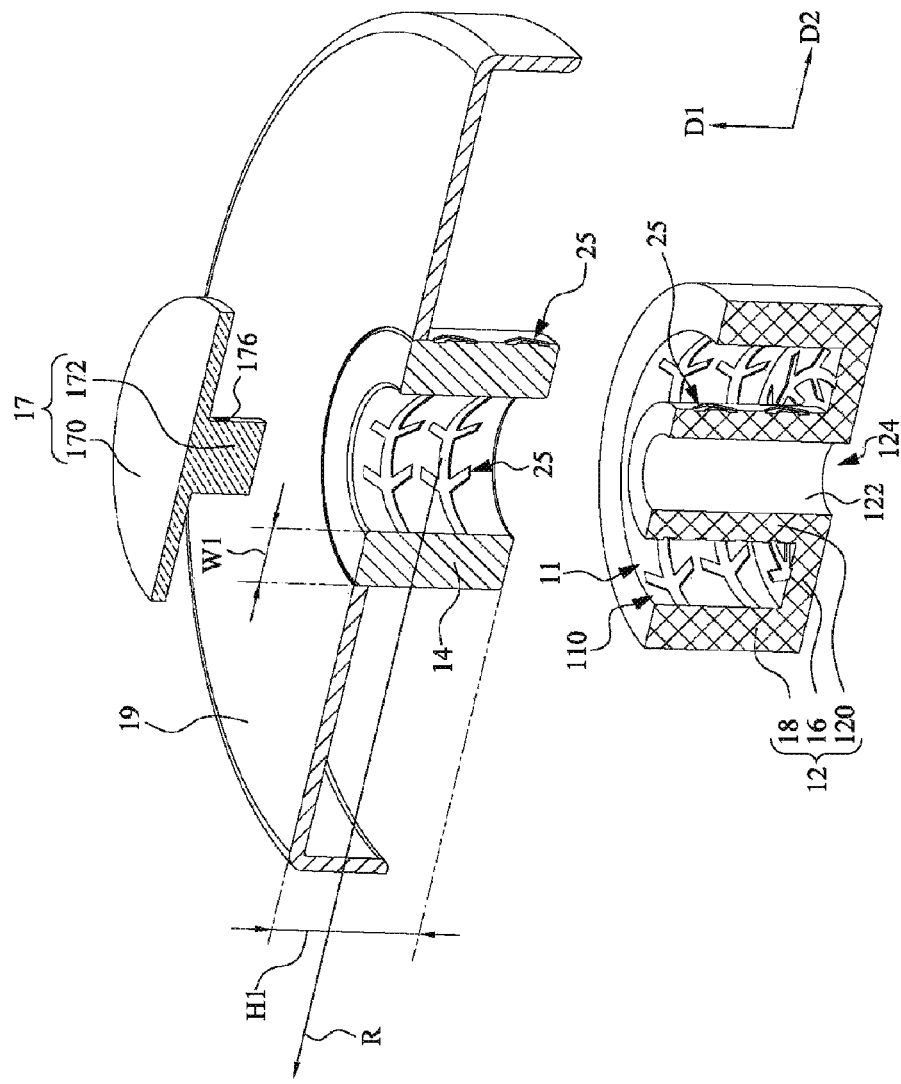
FIG. 2 is an exploded sectional view of a partial structure of a rotational assembly according to an embodiment of the present disclosure.

Referring to FIG. 1 and FIG. 2, FIG. 1 is a sectional view of a rotational assembly 1 according to an embodiment of the present disclosure. FIG. 2 is an exploded sectional view of a partial structure of a rotational assembly 1 according to an embodiment of the present disclosure. To clearly describe the present disclosure, a base 10, a stator 15, and a rotor 13 shown in FIG. 1 are omitted in FIG. 2. As shown in FIG. 1 and FIG. 2, in this embodiment, the rotational assembly 1 includes the base 10, a bearing 12, an oil seal cover 17, the stator 15, a rotating shaft 14, a rotor hub 19, and the rotor 13. The rotating shaft 14, the rotor hub 19, and the rotor 13 in this embodiment are of a rotor structure. The base 10, the bearing 12, the oil seal cover 17, and the stator 15 in this embodiment are of a stator structure, to bear the foregoing rotor structure.

In FIG. 1 and FIG. 2, the bearing 12 is disposed on the base 10 and includes a first ring wall 120, a second ring wall 18, and a baseplate 16. The rotating shaft 14 is sheathed in the first ring wall 120 of the bearing 12 and rotatably disposed on the first ring wall 120. The rotating axis of the rotating shaft 14 is in a direction D1. The second ring wall 18 of the bearing 12 surrounds an outer side of the first ring wall 120. The baseplate 16 of the bearing 12 is connected between the first ring wall 120 and the second ring wall 18.

In this embodiment, the baseplate 16 and the second ring wall 18 are portions of the bearing 12. The baseplate 16 of the bearing 12 extends, essentially in a direction D2, from the first ring wall 120 to the base 10. The second ring wall 18 of the bearing 12 extends in a direction, essentially in the direction D1, far away from the baseplate 16. The base 10 is engaged with an outer edge of the second ring wall 18, extends in a direction far away from the first ring wall 120, and surrounds the second ring wall 18. In this embodiment, the direction D2 and the direction D1 are orthogonal. The first ring wall 120, the second ring wall 18, and the baseplate 16 form a first ring-shaped groove 11. The first ring-shaped groove 11 includes a first opening 110. The rotating shaft 14 is rotatably connected to the first ring-shaped groove 11 by using the first opening 110. In this embodiment, lubricating oil is injected into the first ring-shaped groove 11 to help the rotating shaft 14 rotate relative to the bearing 12. The bearing 12 in this embodiment is an oil-impregnated bearing, a dynamic pressure bearing, or a ceramic bearing. This is not limited in the present disclosure.

In this embodiment, because the bearing 12 includes the first ring wall 120, the second ring wall 18, and the baseplate 16. Therefore, the entire bearing 12 includes a large diameter and provides a larger superficial area to generate an effective oil pressure acting force. Therefore, the bearing 12 in this embodiment provides a large supporting force to maintain operation of the rotating shaft 14 in the first ring-shaped groove 11. The bearing 12 still provides a supporting force with certain degree to the rotating shaft 14 when the thickness of the structure of the bearing 12 in the direction D1 is reduced. Because the bearing 12 in this embodiment includes the baseplate 16, the bearing 12 includes an acting force in a direction that is perpendicular to a bottom surface of the baseplate 16 to support operation of the rotating shaft 14, and operation stability of the rotating shaft 14 in the foregoing direction is improved. In this embodiment, the direction perpendicular to the bottom surface of the baseplate 16 is essentially the same as the direction Dl. Therefore, in this embodiment, a degree of swinging of the rotating shaft 14 in the direction D1 during operation is reduced. According to the foregoing structure configurations, the rotational assembly 1 in this embodiment still provides a supporting force with certain degree to the rotating shaft 14 when the height of the structure of the rotational assembly 1 in the direction D1 is reduced, and the degree of swinging of the rotating shaft 14 in the direction D1 during operation is reduced. Therefore, it is beneficial to apply the rotational assembly 1 in this embodiment to a thin electronic apparatus.

In FIG. 1 and FIG. 2, the rotor hub 19 of the rotational assembly 1 surrounds an outer edge of the rotating shaft 14 and is connected to the bearing 12. In this embodiment, the rotor hub 19 is connected to the rotating shaft 14 by means of welding (for example, laser welding). In another embodiment, the rotor hub 19 is connected to the rotating shaft 14 in a screw locking or interference fit manner. However, the present disclosure is not limited to the foregoing connection manner. In another embodiment, the rotor hub 19 and the rotating shaft 14 is of an integral structure. In addition, an outer edge of the rotor hub 19 is provided with at least one or more fan blades, so that the rotational assembly 1 is used as a fan. This is not limited in the present disclosure. In another embodiment, any suitable element is applied to the present disclosure.

In this embodiment, the stator 15 of the rotational assembly 1 is disposed on a side that is of the second ring wall 18 of the bearing 12 and that is far away from the first ring wall 120. The rotor 13 of the rotational assembly 1 is disposed on the rotor hub 19 to correspond to the stator 15 on the bearing 12. Therefore, a magnetic thrust is generated when the stator 15 on the bearing 12 and the rotor 13 on the rotor hub 19 are mutually exclusive, so that the rotor hub 19 and the rotating shaft 14 that is connected to the rotor hub 19 are pushed by using the bearing 12 as the axis, so as to rotate in a predefined direction. The lubricating oil in the first ring-shaped groove 11 reduces a friction force of the rotating shaft 14 relative to the bearing 12 during rotation.

In FIG. 1 and FIG. 2, the oil seal cover 17 is in contact with the bearing 12 and covers the bearing 12 and the rotating shaft 14. An inner wall 122 of the first ring wall 120 forms a first through hole 124. The oil seal cover 17 includes a covering portion 170 and a protrusion portion 172. The covering portion 170 of the oil seal cover 17 covers the first through hole 124 and the first ring-shaped groove 11. The protrusion portion 172 of the oil seal cover 17 includes a thread 176. The protrusion portion 172 is connected to the covering portion 170, extends to be engaged into the first through hole 124, and is engaged with the inner wall 122 of the first ring wall by using the thread 176. The oil seal cover 17 in this embodiment prevents the lubricating oil in the first ring-shaped groove 11 from leaking, and prevents the rotating shaft 14 from moving in the direction D1 during operation. In this embodiment, a portion that is of the inner wall 122 and that corresponds to the thread 176 of the oil seal cover 17 also includes a thread. In this way, the oil seal cover 17 is engaged with the inner wall 122 of the first ring wall by using the thread 176. According to the foregoing structure configurations, the rotational assembly 1 in this embodiment improves the connection strength between the oil seal cover 17 and the bearing 12.

In this embodiment, the covering portion 170 of the oil seal cover 17 is separated from the first opening 110 of the first ring-shaped groove 11, and an exhaust channel 174 is formed between the covering portion 170 and the first opening 110 of the rotating shaft. The first ring-shaped groove 11 is in communication with the outside of the rotational assembly 1 by using the exhaust channel 174. During high-speed operation of the rotating shaft 14, the temperature of at least a portion of the lubricating oil in the first ring-shaped groove 11 increases due to the high-speed operation. Therefore, the lubricating oil absorbs thermal energy to form a gas. The formed gas unstably exists in the lubricating oil. Consequently, the rotating shaft 14 unstably operates in the first ring-shaped groove 11. According to the foregoing structure configurations, the gas is exhausted out from the first ring-shaped groove 11 by using the exhaust channel 174, so that cases in which the rotating shaft 14 unstably operates in the first ring-shaped groove 11 is reduced.

In FIG. 2, at least one of the bearing 12 and the rotating shaft 14 includes a plurality of recessed portions 25. The recessed portions 25 are located in the first ring-shaped groove 11. That is, in this embodiment, the recessed portions 25 are provided on a surface that is of the first ring wall 120 and that faces the second ring wall 18, a surface that is of the second ring wall 18 and that faces the first ring wall 120, and a surface that is of the baseplate 16 and that faces the bearing 12, and are provided on the rotating shaft 14. In some other embodiments, the recessed portions 25 is disposed on a surface of a side that is of the oil seal cover 17 and that faces the first ring-shaped groove 11. The recessed portions 25 in this embodiment maintain dynamic pressure generated by the lubricating oil during operation of the rotating shaft 14, so as to stabilize operation of the rotating shaft 14 in the first ring-shaped groove 11. In this way, a collision between the rotating shaft 14 and the bearing 12 is avoided, thereby prolonging the service lives of the rotating shaft 14 and the bearing 12. A form of the recessed portion 25 in this embodiment is correspondingly configured according to a forward direction or a reverse direction of the rotational assembly 1 during operation.

Figure 3:
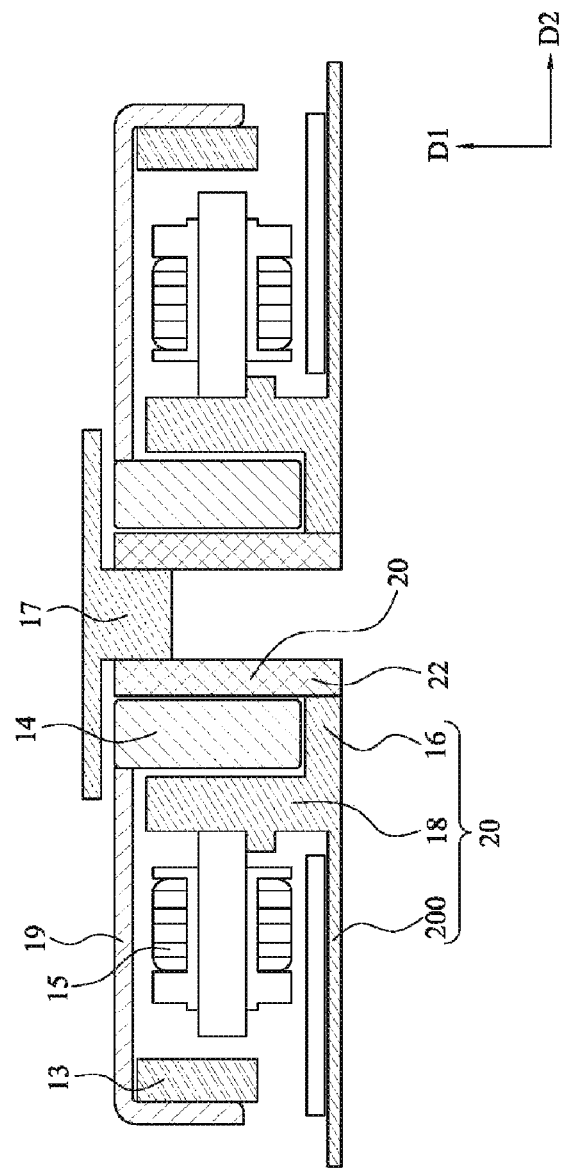
FIG. 3 is a sectional view of a rotational assembly according to another embodiment of the present disclosure, where a baseplate and a second ring wall are formed by a base.

Referring to FIG. 3, FIG. 3 is a sectional view of a rotational assembly 2 according to another embodiment of the present disclosure. As shown in FIG. 3, the rotational assembly 2 in this embodiment includes a base 20, a bearing 22, an oil seal cover 17, a stator 15, a rotating shaft 14, a rotor hub 19, and a rotor 13. Structures and functions of these elements and connection relationships between these elements are roughly the same as those of the rotational assembly 1 shown in FIG. 1 and FIG. 2, so that reference is made to the foregoing related descriptions, and details are not described herein again. Herein, it should be noted that a difference between this embodiment and the embodiment shown in FIG. 1 and FIG. 2 lies in that in this embodiment, the base 20 includes a base body portion 200, a baseplate 16, and a second ring wall 18, and the bearing 22 includes only a first ring wall 120.

In this embodiment, the baseplate 16 of the base 20 is engaged with an outer edge of the first ring wall 120 of the bearing 12. The second ring wall 18 of the base 20 extends in a direction far away from the baseplate 16 in a direction D1. The base body portion 200 of the base 20 extends from a connection between the baseplate 16 and the second ring wall 18 in a direction far away from the first ring wall 120 and surrounds the second ring wall 18.

Therefore, the baseplate 16, the second ring wall 18, and the base body portion 200 is designed as integral according to an actual requirement.

Figure 4:
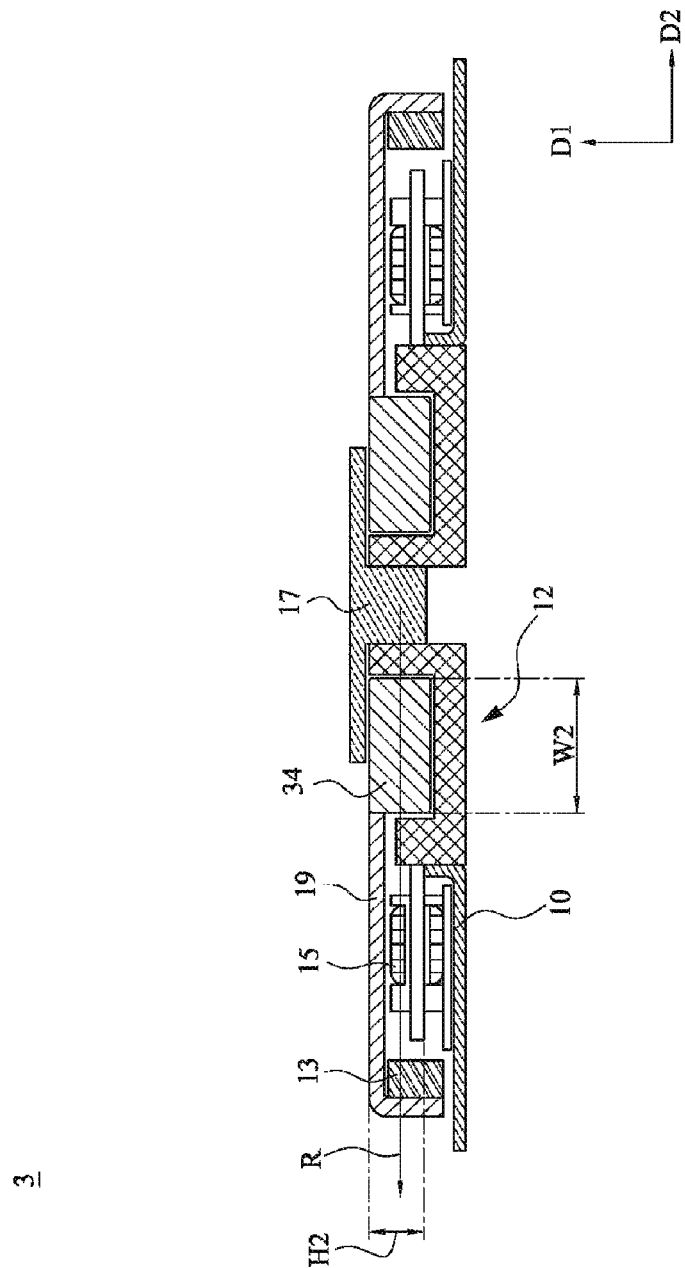
FIG. 4 is a sectional view of a rotational assembly according to another embodiment of the present disclosure, where the thickness of a rotating shaft is less than the width of the rotating shaft in the radial direction.

Referring to FIG. 4, FIG. 4 is a sectional view of a rotational assembly 3 according to another embodiment of the present disclosure. As shown in FIG. 4, the rotational assembly 3 in this embodiment includes a base 10, a bearing 12, an oil seal cover 17, a stator 15, a rotating shaft 34, a rotor hub 19, and a rotor 13. Structures and functions of these elements and connection relationships between these elements are roughly the same as those of the rotational assembly 1 shown in FIG. 1 and FIG. 2, so that reference is made to the foregoing related descriptions, and details are not described herein again. Herein, it should be noted that a difference between this embodiment and the embodiment shown in FIG. 1 and FIG. 2 lies in that the height H2 of the rotating shaft 34 in this embodiment is less than the width W2 of the rotating shaft 34 in the radial direction R, and the height H1 of the rotating shaft 14 in the embodiment shown in FIG. 2 is greater than the width W1 of the rotating shaft 14 in the radial direction R.

In this embodiment, the height H2 of the rotating shaft 34 is less than the width W2 of the rotating shaft 34 in the radial direction R. Therefore, a ratio of the height H2 of the rotating shaft 34 to the width W2 is relatively small. The direction of the height H2 of the rotating shaft 34 is in a direction D1. Therefore, the rotational assembly 3 include a relatively thin thickness in the direction D1. The bearing 12 includes a first ring wall 120, a second ring wall 18, and a baseplate 16, so that a larger superficial area is provided to support operation of the rotating shaft 34. In this way, during actual operation, the rotational assembly 3 in this embodiment include a relatively thin thickness to apply to a thin electronic apparatus.

Referring to FIG. 5 and FIG. 6, FIG. 5 is a sectional view of a rotational assembly 4 according to another embodiment of the present disclosure, and FIG. 6 is a sectional views of a rotational assembly 5 according to another embodiment of the present disclosure. As shown in FIG. 5 and FIG. 6, the rotational assembly 4 in this embodiment includes a base 10, a bearing 42, an oil seal cover 17, a stator 15, a rotating shaft 44, a rotor hub 19, and a rotor 13; however, the rotational assembly 5 includes a base 10, a bearing 52, an oil seal cover 17, a stator 15, a rotating shaft 54, a rotor hub 19, and a rotor 13. Structures and functions of these elements and connection relationships between these elements are roughly the same as those of the rotational assembly 1 shown in FIG. 1 and FIG. 2, so that reference is made to the foregoing related descriptions, and details are not described herein again.

Herein, it should be noted that a difference between this embodiment and the embodiment shown in FIG. 1 and FIG. 2 lies in that in this embodiment, a distance between at least a portion (refer to FIG. 5) of a bottom surface 460 of a baseplate 46 of the bearing 42 and a first opening 110 of a first ring-shaped groove 11 gradually changes from a first ring wall 120 of the bearing 42 to a second ring wall 18, and a distance between at least a portion (refer to FIG. 6) of a bottom surface 560 of a baseplate 56 of the bearing 52 and a first opening 110 of a first ring-shaped groove 11 gradually changes from a first ring wall 120 of the bearing 52 to a second ring wall 18. In addition, shapes of the rotating shaft 44 of the rotational assembly 4 and the rotating shaft 54 of the rotational assembly 5 respectively conform to the bottom surface 460 of the baseplate 46 and the bottom surface 560 of the baseplate 56. Specifically, in FIG. 5, the distance between the at least a portion of the bottom surface 460 of the baseplate 46 and the first opening 110 of the first ring-shaped groove 11 gradually increases from the first ring wall 120 of the bearing 42 to the second ring wall 18. In this way, the superficial area of the bottom surface 460 of the baseplate 46 is increased to provide a large supporting force to the rotating shaft 44. Therefore, the bearing 42 still provides a supporting force with certain degree to the rotating shaft 44 when the height of the structure of the bearing 42 in a direction D1 is reduced. Optionally, in FIG. 6, the distance between the at least a portion of the bottom surface 560 of the baseplate 56 and the first opening 110 of the first ring-shaped groove 11 gradually decreases from the first ring wall 120 of the bearing 52 to the second ring wall 18, so that the superficial area of the bottom surface 560 of the baseplate 56 is also increased to provide a large supporting force to the rotating shaft 54.

Referring to FIG. 7, FIG. 7 is a sectional view of a rotational assembly 6 according to another embodiment of the present disclosure. As shown in FIG. 7, the rotational assembly 6 in this embodiment includes a base 10, a bearing 12, an oil seal cover 17, a stator 15, a rotating shaft 64, a rotor hub 69, and a rotor 13. Structures and functions of these elements and connection relationships between these elements are roughly the same as those of the rotational assembly 1 shown in FIG. 1 and FIG. 2, so that reference is made to the foregoing related descriptions, and details are not described herein again. Herein, it should be noted that a difference between this embodiment and the embodiment in FIG. 1 and FIG. 2 lies in that in this embodiment, the rotor hub 69 of the rotational assembly 6 surrounds and is engaged with an outer edge of the rotating shaft 64.

According to the foregoing structure configurations, assembling of the rotor hub 69 and the rotating shaft 64 is completed by engaging only the rotor hub 69 of the rotational assembly 6 with the outer edge of the rotating shaft 64.

Referring to FIG. 8, FIG. 8 is a sectional view of a rotational assembly 8 according to another embodiment of the present disclosure. As shown in FIG. 8, the rotational assembly 8 in this embodiment includes a base 10, a bearing 12, an oil seal cover 87, a stator 15, a rotating shaft 14, a rotor hub 19, and a rotor 13. Structures and functions of these elements and connection relationships between these elements are roughly the same as those of the rotational assembly 1 shown in FIG. 1 and FIG. 2, so that reference is made to the foregoing related descriptions, and details are not described herein again. Herein, it should be noted that a difference between this embodiment and the embodiment shown in FIG. 1 and FIG. 2 lies in that in this embodiment, a protrusion portion 872 of the oil seal cover 87 is designed as a ring wall, and an inner wall 874 of the ring wall forms a second through hole 876. The second through hole 876 is in communication with a first through hole 124.

Referring to FIG. 9, FIG. 9 is a sectional view of a rotational assembly 9 according to another embodiment of the present disclosure. As shown in FIG. 9, the rotational assembly 9 in this embodiment includes a base 10, a bearing 12, an oil seal cover 97, a stator 15, a rotating shaft 14, a rotor hub 19, and a rotor 13. Structures and functions of these elements and connection relationships between these elements are roughly the same as those of the rotational assembly 8 shown in FIG. 8, so that reference is made to the foregoing related descriptions, and details are not described herein again. Herein, it should be noted that a difference between this embodiment and the embodiment shown in FIG. 8 lies in that in this embodiment, the oil seal cover 97 further includes a third ring wall 978.

In this embodiment, the oil seal cover 97 includes a covering portion 170, a protrusion portion 872, and a third ring wall 978. The covering portion 170 of the oil seal cover 97 is connected between the protrusion portion 872 and the third ring wall 978, and extends from the protrusion portion 872 to the third ring wall 978. The third ring wall 978 of the oil seal cover 97 surrounds a side that is of the covering portion 170 and that is relative to the protrusion portion 872, and protrudes in a direction close to the bearing 12. The protrusion portion 872, the covering portion 170, and the third ring wall 978 form a second ring-shaped groove 91. An opening of the second ring-shaped groove 91 faces the bearing 12 and the rotating shaft 14, and faces a first opening 110 of a first ring-shaped groove 11. A first ring wall 120 of the bearing 12 and a portion that is of the rotating shaft 14 and that is far away from a baseplate 16 are partially accommodated in the second ring-shaped groove 91, and the rotating shaft 14 is rotatably connected to the second ring-shaped groove 91. In this embodiment, lubricating oil is injected into the second ring-shaped groove 91 to help the rotating shaft 14 rotate relative to the bearing 12. The recessed portions 25 shown in FIG. 2 is disposed in the second ring-shaped groove 91 in this embodiment, that is, the recessed portions 25 shown in FIG. 2 is disposed at a side that is of at least one of the third ring wall 978 and the covering portion 170 and that faces the second ring-shaped groove 91. In this way, the second ring-shaped groove 91 of the rotational assembly 9 limits a movement of the rotating shaft 14 in a direction D1 during operation, and the second ring-shaped groove 91 provides a larger superficial area to generate an effective oil pressure acting force to maintain operation of the rotating shaft 14.

Referring to FIG. 10, FIG. 10 is a sectional view of a rotational assembly 30 according to another embodiment of the present disclosure. As shown in FIG. 10, the rotational assembly 30 in this embodiment includes a base 10, a bearing 302, an oil seal cover 87, a stator 15, a rotating shaft 14, a rotor hub 19, and a rotor 13. Structures and functions of these elements and connection relationships between these elements are roughly the same as those of the rotational assembly 8 shown in FIG. 8, so that reference is made to the foregoing related descriptions, and details are not described herein again. Herein, it should be noted that a difference between this embodiment and the embodiment shown in FIG. 8 lies in that in this embodiment, a side that is of a baseplate 16 of the bearing 302 and that is far away from a second ring wall 18 is connected to a cylinder 312, and the first ring wall 120 shown in FIG. 8 is not included.

In this embodiment, the cylinder 312 of the bearing 302 includes a ring-shaped dent 326. The ring-shaped dent 326 of the cylinder 312 is located at a side that is of the cylinder 312 and that is far away from the baseplate 16, and is dent in the cylinder 312 in a direction far away from the second ring wall 18. A protrusion portion 872 of the oil seal cover 87 extends to be engaged into the ring-shaped dent 326 of the cylinder 312. In this way, the structure of the bearing 302 in this embodiment is simplified to reduce difficulty in a process of the bearing 302.

Referring to FIG. 11, FIG. 11 is a sectional view of a rotational assembly 31 according to another embodiment of the present disclosure. As shown in FIG. 11, the rotational assembly 31 in this embodiment includes a base 10, a bearing 302, a stator 15, a rotating shaft 14, a rotor hub 319, and a rotor 13. Structures and functions of these elements and connection relationships between these elements are roughly the same as those of the rotational assembly 30 shown in FIG. 10, so that reference is made to the foregoing related descriptions, and details are not described herein again. Herein, it should be noted that a difference between this embodiment and the embodiment shown in FIG. 10 lies in that in this embodiment, the rotor hub 319 covers the bearing 302 and the rotating shaft 14 and is connected to an end portion that is of the rotating shaft 14 and that is far away from a baseplate 16. In addition, the rotational assembly 31 does not include the oil seal cover 87 shown in FIG. 10.

In this embodiment, the rotor hub 319 covers the bearing 302 and the rotating shaft 14 and is connected to the end portion that is of the rotating shaft 14 and that is far away from the baseplate 16. Therefore, the oil seal cover is omitted in this embodiment, and leaking of lubricating oil in a first ring-shaped groove 11 is prevented by using the rotor hub 319. A portion that is of the rotor hub 319 and that corresponds to a cylinder 312 includes a second opening 320. The second opening 320 is in communication with the first ring-shaped groove 11 by using a ring-shaped dent 326. Therefore, the first ring-shaped groove 11 is in communication with the outside of the rotational assembly 31 by using the second opening 320. During high-speed operation of the rotating shaft 14, the temperature of at least a portion of the lubricating oil in the first ring-shaped groove 11 increases due to the high-speed operation. Therefore, the lubricating oil absorbs thermal energy to form a gas. The formed gas unstably exists in the lubricating oil. Consequently, the rotating shaft 14 unstably operates in the first ring-shaped groove 11. According to the foregoing structure configurations, the gas is exhausted out from the first ring-shaped groove 11 by using the second opening 320, so that cases in which the rotating shaft 14 unstably operates in the first ring-shaped groove 11 is reduced.

Referring to FIG. 12, FIG. 12 is a sectional view of a rotational assembly 32 according to another embodiment of the present disclosure. As shown in FIG. 12, the rotational assembly 32 in this embodiment includes a base 10, a bearing 302, a stator 15, a rotating shaft 14, a rotor hub 329, and a rotor 13. Structures and functions of these elements and connection relationships between these elements are roughly the same as those of the rotational assembly 31 shown in FIG. 11, so that reference is made to the foregoing related descriptions, and details are not described herein again. Herein, it should be noted that a difference between this embodiment and the embodiment shown in FIG. 11 lies in that, in this embodiment, the rotor hub 329 is of a structure without any through hole and completely covers the base 10, the bearing 302, and the rotating shaft 14. Therefore, the rotor hub 329 in this embodiment prevents particles in air from entering the rotational assembly 32 by using the through hole, to avoid hindering caused by the particles during rotation of the rotating shaft 14 relative to the bearing 302.

According to the foregoing detailed descriptions of the specific embodiments of the present disclosure, it is obviously learned that the bearing of the rotational assembly in this embodiment includes a first ring wall, a second ring wall, and a baseplate. Therefore, the entire bearing includes a large diameter and provides a larger superficial area to generate an effective oil pressure acting force. Therefore, the bearing in this embodiment may provide a large supporting force to maintain operation of the rotating shaft in a first ring-shaped groove. In this way, the bearing still provides a supporting force with certain degree to the rotating shaft when the thickness of the structure of the bearing is reduced.

In addition, because the bearing in this embodiment includes the baseplate, the bearing includes an acting force in a direction that is perpendicular to a bottom surface of the baseplate to support operation of the rotating shaft, and operation stability of the rotating shaft in the foregoing direction is improved. Therefore, in this embodiment, a degree of swinging of the rotating shaft in the foregoing direction during operation is reduced. According to the foregoing structure configurations, the rotational assembly in this embodiment still provides a supporting force with certain degree to the rotating shaft when the thickness of the structure of the rotational assembly is reduced, and the degree of swinging of the rotating shaft in the direction during operation is reduced. Therefore, it is beneficial to apply the rotational assembly in this embodiment to a thin electronic apparatus.

Although the present disclosure discloses the embodiments as above, the above embodiments are not intended to limit the present disclosure. A person skilled can make some modifications and improvements without departing from the spirit and scope of the present disclosure. Therefore, the protection scope of the present disclosure is subject to the appended claims.

What is claimed is:

1. A rotational assembly, comprising:
   a base;
   a bearing, disposed on the base and comprising a first ring wall, wherein an inner wall of the first ring wall forms a through hole;
   a rotating shaft, sleeved on the first ring wall and rotatably disposed on the first ring wall; and
   an oil seal cover in contact with the bearing, covering the bearing and the rotating shaft, comprising a covering portion that at least covers the through hole, and comprising a protrusion portion that is connected to the covering portion and extends to be engaged into the through hole.

2. The rotational assembly according to claim 1, wherein the rotating shaft includes a height along the rotating axis, the rotating shaft includes a width along the radial direction, and the height of the rotating shaft is less than the width.

3. The rotational assembly according to claim 1, further comprising a baseplate and a second ring wall, wherein the second ring wall surrounds an outer side of the first ring wall; the baseplate is connected between the first ring wall and the second ring wall; the first ring wall, the second ring wall, and the baseplate form a first ring-shaped groove; and the rotating shaft is rotatably supported in the first ring-shaped groove.

4. The rotational assembly according to claim 3, wherein the baseplate and the second ring wall are portions of the base, the base further comprises a body portion, the baseplate is engaged with an outer edge of the first ring wall, the second ring wall extends away from the baseplate, and the body portion extends from a connection between the baseplate and the second ring wall and away from the first ring wall and surrounds the second ring wall.

5. The rotational assembly according to claim 3, wherein the baseplate and the second ring wall are portions of the bearing, the baseplate extends from the first ring wall to the base, the second ring wall extends away from the baseplate, and the base is engaged with an outer edge of the second ring wall, extends away from the first ring wall, and surrounds the second ring wall.

6. The rotational assembly according to claim 3, wherein the oil seal cover is separated from an opening of the first ring-shaped groove, an exhaust channel is formed between the oil seal cover and the opening, and the first ring-shaped groove is in communication with the outside of the rotational assembly by using the exhaust channel.

7. The rotational assembly according to claim 3, further comprising a rotor hub, wherein the rotor hub is connected to an end portion of the rotating shaft that extends away from the baseplate, covers the bearing, the rotating shaft, and the base, and includes an opening, and the first ring-shaped groove is in communication with the outside of the rotational assembly by using the opening.

8. The rotational assembly according to claim 3, wherein at least one of the bearing and the rotating shaft includes a plurality of recessed portions, and the recessed portions are located in the first ring-shaped groove.

9. The rotational assembly according to claim 8, wherein the recessed portions are provided on a surface that is of the first ring wall and that faces the second ring wall.

10. The rotational assembly according to claim 8, wherein the recessed portions are provided on a surface that is of the second ring wall and that faces the first ring wall.

11. The rotational assembly according to claim 8, wherein the recessed portions are provided on a surface that is of the baseplate and that faces the first ring-shaped groove.

12. The rotational assembly according to claim 3, wherein the baseplate includes a bottom surface, and a distance between at least a portion of the bottom surface and an opening of the first ring-shaped groove gradually changes from the first ring wall to the second ring wall.

13. The rotational assembly according to claim 12, wherein the baseplate includes the bottom surface, and the distance between at least a portion of the bottom surface and the opening of the first ring-shaped groove gradually increases from the first ring wall to the second ring wall.

14. The rotational assembly according to claim 1, further comprising a rotor hub, wherein the rotor hub surrounds and is engaged with an outer edge of the rotating shaft.

15. A rotational assembly, comprising:
   a base;
   a bearing disposed on the base and comprising a first ring wall, a second ring wall surrounding an outer side of the first ring wall, and a baseplate connected between the first and second ring walls, wherein the first and second ring walls and the baseplate form a first ring-shaped groove, and a distance between at least a portion of a bottom surface of the baseplate and an opening of the first ring-shaped groove gradually decreases from the first ring wall to the second ring wall; and
   a rotating shaft sleeved on the first ring wall and rotatably supported in the first ring-shaped groove.

16. A rotational assembly, comprising:
   a base;
   a bearing, disposed on the base and comprising a first ring wall, a second ring wall surrounding an outer side of the first ring wall, and a baseplate connected between the first and second ring walls, wherein an inner wall of the first ring wall forms a through hole and the first and second ring walls and the baseplate form a first ring-shaped groove;

a rotating shaft, sleeved on the first ring wall and rotatably supported in the first ring-shaped groove; and an oil seal cover comprising a covering portion that covers an opening of the first ring-shaped groove, comprising a protrusion portion that is connected to the covering portion and extends to be engaged into the through hole, and comprising a third ring wall that surrounds and is connected to a side of the covering portion opposite to the protrusion portion, wherein the third ring wall, the covering portion, and the protrusion portion form a second ring-shaped groove, and an opening of the second ring-shaped groove faces the opening of the first ring-shaped groove.

* * * * *